United States Patent [19]
Bulman et al.

[11] Patent Number: 6,109,868
[45] Date of Patent: Aug. 29, 2000

[54] REDUCED-LENGTH HIGH FLOW INTERSTAGE AIR EXTRACTION

[75] Inventors: David E. Bulman; Peter J. Wood; John J. Decker, all of Cincinnati; Esther S. Ng, West Chester, all of Ohio

[73] Assignee: General Electric Company, Cincinnati, Ohio

[21] Appl. No.: 09/206,506

[22] Filed: Dec. 7, 1998

[51] Int. Cl.$^7$ .................................................. F01D 13/02
[52] U.S. Cl. .......................... 415/144; 415/185; 415/191; 415/208.2
[58] Field of Search .................................. 415/144, 145, 415/189, 190, 208.2, 209.2, 209.3, 209.4, 191, 185

[56] References Cited

U.S. PATENT DOCUMENTS

| | | | |
|---|---|---|---|
| 3,142,438 | 7/1964 | McKenzie | 415/144 |
| 3,632,223 | 1/1972 | Hampton | 415/144 |
| 3,777,489 | 12/1973 | Johnson et al. | 60/226 R |
| 3,945,759 | 3/1976 | Bobo | 415/145 |
| 4,844,689 | 7/1989 | Seed | 415/169.1 |
| 5,155,993 | 10/1992 | Baughman et al. | 60/226.1 |
| 5,531,565 | 7/1996 | Meindl et al. | 415/144 |

FOREIGN PATENT DOCUMENTS

| | | |
|---|---|---|
| 1324790 | 10/1970 | United Kingdom . |
| 1501916 | 6/1975 | United Kingdom . |
| 2048386 | 3/1980 | United Kingdom . |
| 2192229 | 7/1986 | United Kingdom . |

*Primary Examiner*—Edward K. Look
*Assistant Examiner*—Ninh Nguyen
*Attorney, Agent, or Firm*—Andrew C. Hess; Nathan D. Herkamp

[57] ABSTRACT

A high flow interstage air extraction system for a gas turbine engine includes a 360 degree annular slot formed in a compressor stator casing by a first wall and a second wall. A plurality of baffle plates extend from the second wall to eliminate circumferential airflow. A plurality of stator vane platforms form at least a portion of the first wall. The annular slot results in large amounts of interstage compressor air being extracted from the compressor without adding length to the compressor and the engine.

20 Claims, 5 Drawing Sheets

REDUCED-LENGTH HIGH FLOW INTERSTAGE AIR EXTRACTION

BACKGROUND OF THE INVENTION

This invention relates generally to gas turbine engines, and more particularly to the extraction of air from a compressor of a gas turbine engine.

Gas turbine engines typically include a multistage axial flow high pressure compressor which supplies high pressure air to a combustor. The compressor includes multiple stages. Each stage is composed of a stationary component referred to as a stator and a rotational component, which adds work to the system referred to as a rotor. A portion of compressed interstage air may be extracted for turbine section cooling, airframe pressurization, anti-icing, and other uses. Because work is added to air as it flows through each stage of the compressor, it is desirable to extract, or bleed, air from the compressor after the minimum number of stages.

Small quantities of air can be extracted through bleed openings between stator vanes. As the volume of air required to be extracted from the compressor increases, the required area of the openings increases until the openings are too large to be located between the vanes. To extract large volumes of air, multiple rows of openings typically must be located downstream from a vane row. The axial spacing between the trailing edge of the vane row and the leading edge of the next blade row typically must be increased in order to accommodate the bleed openings. This results in an increase in the overall compressor length which adds weight and cost to the engine.

Accordingly, it would be desirable to provide for extraction of large volumes of interstage compressor air without increasing the length of the compressor.

SUMMARY OF THE INVENTION

These and other objects may be attained by a compressor interstage air extraction system configured to be incorporated into a high pressure compressor and including an annular slot that extends through a stator casing of the compressor. More specifically, an annular slot, sometimes referred to herein as a vane passageway, extends through the stator casing. The slot is formed by a first wall and a second wall which extend through the casing. Air may be extracted from the compressor through the annular slot.

In operation, air flows from a forward portion to an aft portion of the compressor, and some of the air may be diverted and bled off through the vane passageway. In order to not add length to the compressor, and thereby maintain typical stator to rotor axial spacings, the bleed air is diverted into the slot as it passes by the stator vane. In one embodiment, to remove the circumferential component of the airflow, which decreases the efficiency of the air extraction system, the annular slot is partitioned by a row of stator vanes and a plurality of baffle plates.

This air extraction system enables extraction of large volumes of interstage compressor air without requiring an increase in the length of the compressor, and without adding any significant weight to the engine.

DETAILED DESCRIPTION

Figure 1:
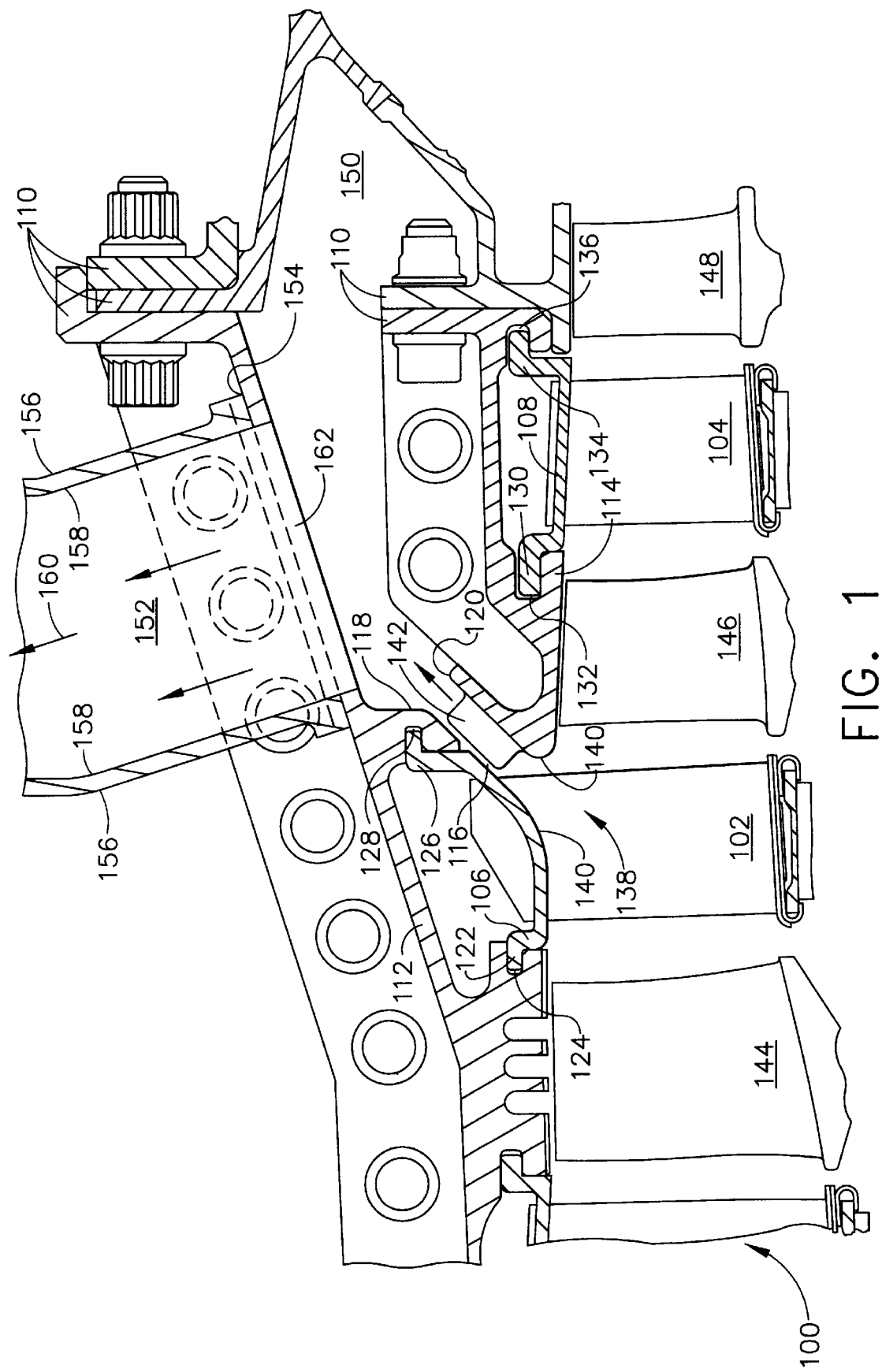
FIG. 1 is a schematic illustration of a high pressure multistage compressor with an annular slot.

FIG. 1 illustrates a multistage compressor 100 for a gas turbine engine. Compressor 100 is a multistage open system including a plurality of stationary components, typically referred to as stators, and a plurality of rotational components, typically referred to as rotors, which add work to the system. Compressor 100 has a longitudinally forward portion (not shown) and an aft portion (not shown). During engine operation, air flows longitudinally from the forward portion to the aft portion of compressor 100. The air is compressed at each stage of compressor 100, and the compressed air is directed to an inlet of a combustor (not shown).

Compressor 100 includes stator vanes 102 and 104. Each stator vane 102 and 104 is fixedly attached to a vane platform 106 and 108, respectively. Vane platforms 106 and 108 are attached to a stator casing 110 of compressor 100. Stator casing 110 includes a first portion 112 and a second portion 114, and casing 110 forms at least a portion of an outer boundary of the air flowpath through compressor 100. An annular slot 116 extends through stator casing 110 and separates first portion 112 from second portion 114. In one embodiment, annular slot 116 extends completely around, i.e. 360 degrees, casing 110 and forms an air extraction bleed slot.

Annular slot 116 is formed by a first wall 118 and a second wall 120. Vane platforms 106 are fixedly attached to stator casing first portion 112. More specifically, vane platforms 106 have a first end 122 positioned within an opening 124 in stator casing first portion 112 and a second end 126 positioned within an opening 128 in stator casing first portion 112. Vane platforms 108 have a first end 130 positioned within an opening 132 in stator casing second portion 114 and a second end 134 positioned within an opening 136 in stator casing second portion 114. Stator casing first portion 112 forms at least a portion of first wall 118 and stator casing second portion 114 forms at least a portion of second wall 120.

Vane platforms 106 are smoothed and rounded to extend away from the air flowpath. A passageway 138 extends through annular slot 116 and includes a flowpath entrance 140. First wall 118 and second wall 120 form at least a portion of a boundary of the flowpath.

The rounded, or curved, vane platforms 106 reduce discontinuities as air flows through flowpath entrance 140 to annular slot 116. In one embodiment, vane platforms 106 form a portion of first wall 118 of annular slot 116. Vane platforms 106 also form a portion of an outer boundary of the air flowpath. At least one row of stator vanes 102 partition passageway 138 to reduce circumferential airflow in annular slot 116.

A plurality of baffle plates 142 are located in annular slot 116 to further reduce circumferential airflow. Baffle plates 142 are fixedly attached to, and supported by, stator casing second portion 114. A plurality of rotor blades 144, 146, and 148 rotate and add work to compressor 100. Stator casing 110 includes a cavity 150.

A transfer unit 152 includes a first end 154, a second end (not shown), an outer wall 156, an inner wall 158 and a passageway 160. An opening 162 extends through stator casing 110 and is in communication with cavity 150 and with an engine manifold (not shown). First end 154 is connected to stator casing 110 and the second end of transfer unit 152 is connected to the engine manifold.

Figure 2:
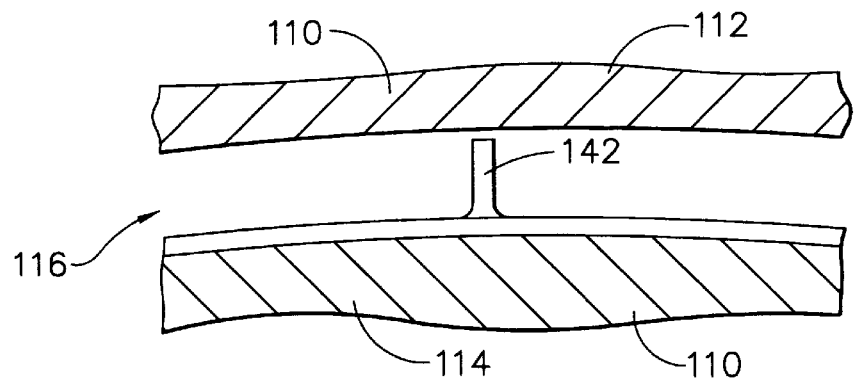
FIG. 2 is a cross section view along line 2—2 of the annular slot shown in FIG. 1.

FIG. 2 is a cross section view of annular slot 116. A plurality of baffle plates 142 are located in annular slot 116 between stator casing first portion 112 and stator casing second portion 114. Baffle plates 142 are connected to stator casing second portion 114 and extend from second portion 114 into annular slot 116. Baffle plates 142 prevent air turbulence and thus reduce inefficiencies in annular slot 116. Alternatively, baffle plates 142 can be unitary with stator casing second portion 114.

As compressed air flows toward a combustor (not shown), annular slot 116 allows for extraction of large quantities of compressed air. Annular slot 116 extends substantially around a compressor (not shown in FIG. 2) and is in flow communication with a transfer unit (not shown in FIG. 2) through which at least a portion of the compressed air flows for later uses. Air extraction efficiency is maintained by the partitioning of annular slot 116 by a plurality of stator vanes (not shown in FIG. 2) and baffle plates 142.

In one embodiment, annular slot 116 is positioned between the stator vanes located in a third stage of the compressor and a plurality of rotor blades (not shown in FIG. 2) located in a fourth stage of the compressor. Annular slot 116 is fabricated by casting stator casing 110 with annular slot 116 formed therein. The location of annular slot 116 allows for extraction of large amounts of compressed air for other uses.

Figure 3:
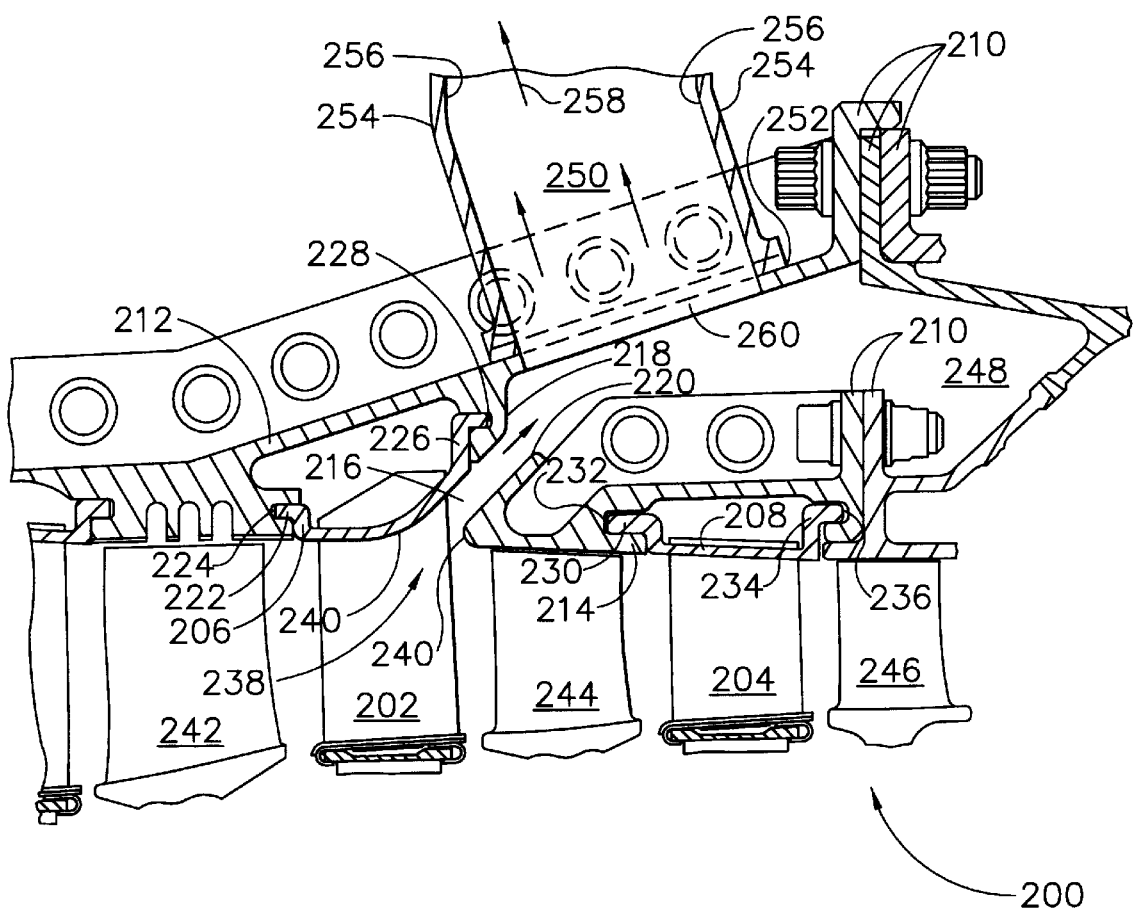
FIG. 3 is a schematic illustration of an alternate embodiment of a high pressure multistage compressor with an annular slot.

FIG. 3 illustrates a multistage compressor 200 according to an alternate embodiment. Compressor 200 has a longitudinally forward portion (not shown) and an aft portion (not shown). During engine operation, air flows longitudinally from the forward portion to the aft portion of compressor 200. Compressor 200 includes a plurality of stator vanes 202 and 204 fixedly attached to a plurality of vane platforms 206 and 208, respectively. Vane platforms 206 and 208 are attached to a stator casing 210 of compressor 200. Stator casing 210 includes a first portion 212 and a second portion 214.

Stator casing 210 forms at least a portion of an outer boundary of the air flowpath. Compressor 200 also includes an annular slot 216 formed through at least a portion of stator casing 210. Annular slot 216 extends between stator casing first portion 212 and stator casing second portion 214. In one embodiment, annular slot 216 extends completely around, i.e. 360 degrees, casing 210 and forms an air extraction bleed slot.

Annular slot 216 is formed by a first wall 218 and a second wall 220. Vane platforms 206 are fixedly attached to stator casing first portion 212. More specifically, vane platforms 206 have a first end 222 positioned within an opening 224 in stator casing first portion 212 and a second end 226 positioned within an opening 228 in stator casing first portion 212. Vane platforms 208 have a first end 230 positioned within an opening 232 in stator casing second portion 214 and a second end 234 positioned within an opening 236 in stator casing second portion 214. Stator casing first portion 212 forms at least a portion of first wall 218 and stator casing second portion 214 forms at least a portion of second wall 220.

Vane platforms 206 are smoothed and rounded to extend away from the air flowpath. A passageway 238 extends through annular slot 216 and includes a flowpath entrance 240. First wall 218 and second wall 220 form at least a portion of a boundary of the flowpath.

The rounded, or curved, vane platforms 206 reduce discontinuities as air flows through flowpath entrance 240 to annular slot 216. In one embodiment, vane platforms 206 form a portion of first wall 218 of annular slot 216. Vane platforms 206 also form a portion of an outer boundary of the compressed air flowpath. At least one row of stator vanes 202 partition passageway 238 to reduce circumferential airflow to annular slot 216. A plurality of rotor blades 242, 244, and 246 rotate and add work to compressor 200.

Stator casing 210 includes a cavity 248. A transfer unit 250 includes a first end 252, a second end (not shown), an outer wall 254, an inner wall 256 and a passageway 258. An opening 260 extends through stator casing 210 and is in communication with cavity 248 and with an engine manifold (not shown). First end 252 is connected to stator casing 210 and the second end of transfer unit 250 is connected to the engine manifold.

In one embodiment, annular slot 216 is fabricated by casting stator casing 210 with annular slot 216 formed therein. The location of annular slot 216 allows for extraction of large amounts of compressed air for other uses and does not result in added weight or cost for the benefits provided.

Figure 4:
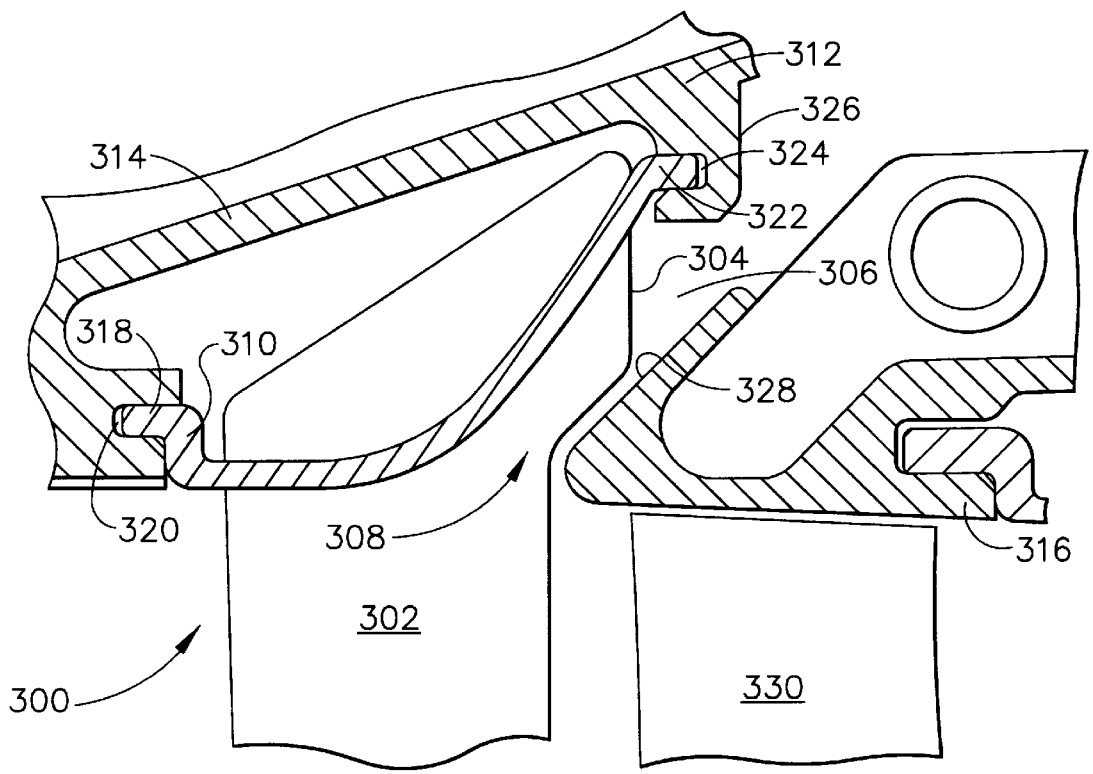
FIG. 4 is a schematic illustration of another embodiment of a high pressure multistage compressor with an annular slot.

FIG. 4 illustrates a multistage compressor 300 according to a further embodiment. Compressor 300 includes a plurality of stator vanes 302 having a trailing edge 304. Compressor 300 also includes an annular slot 306 and an airflow passageway 308. Trailing edge 304 extends into annular slot 306 to reduce circumferential airflow. Stator vanes 302 are fixedly attached to a plurality of vane platforms 310. Vane platforms 310 are fixedly attached to stator casing 312 of compressor 300. Stator casing 312 includes a first portion 314 and a second portion 316.

Vane platforms 310 are fixedly attached to stator casing first portion 314. More specifically, vane platforms 310 have a first end 318 positioned within an opening 320 in stator casing first portion 314 and a second end 322 positioned within an opening 324 in stator casing first portion 314. Annular slot 306 is formed through at least a portion of stator casing 312. Annular slot 306 extends between stator casing first portion 314 and stator casing second portion 316.

Stator casing first portion 314 forms at least a portion of a first wall 326 of annular slot 306. Stator casing second portion 316 forms a second wall 328 of annular slot 306. Vane platforms 310 are smoothed and rounded to extend away from the air flowpath to allow for efficient pressurized air extraction through annular slot 306. Stator vanes 302 partition annular slot 306 to reduce circumferential airflow. Compressor 300 also includes a plurality of rotor blades 330.

Figure 5:
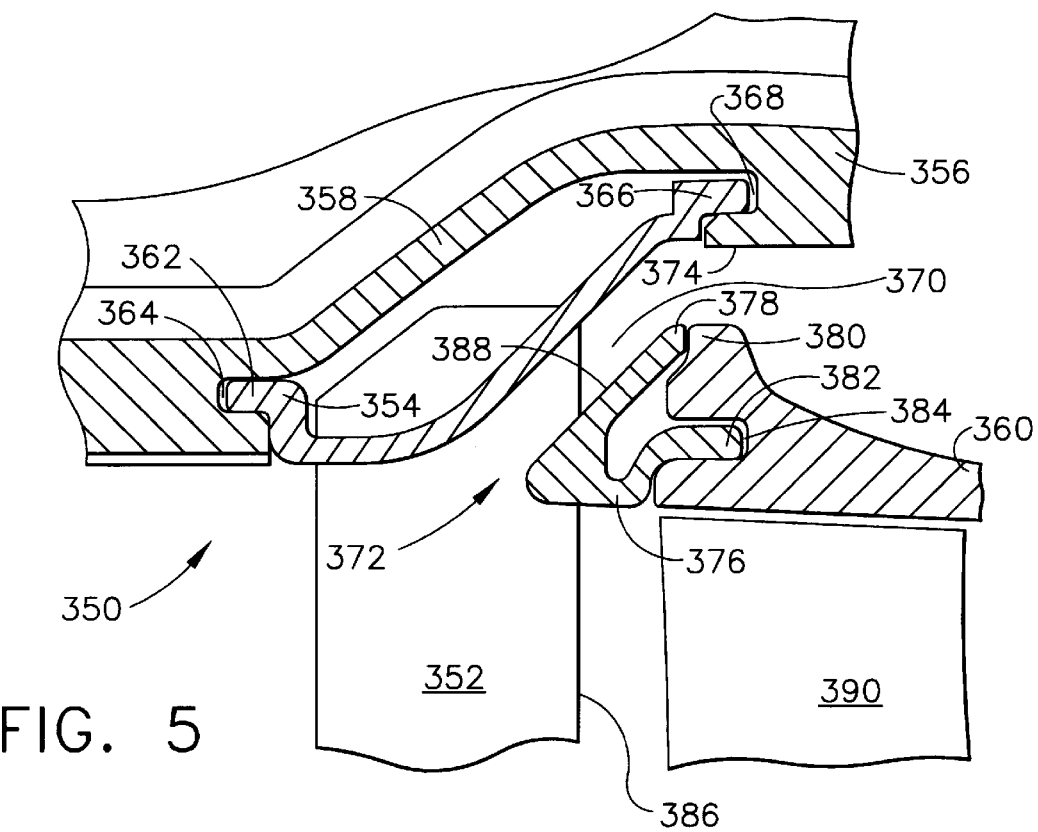
FIG. 5 is a schematic illustration of a further embodiment of a high pressure multistage compressor with an annular slot.

FIG. 5 illustrates a multistage compressor 350 according to another embodiment. Compressor 350 includes a plurality of stator vanes 352 fixedly attached to a plurality of vane platforms 354. Vane platforms 354 are attached to a stator casing 356. Stator casing 356 includes a first portion 358 and a second portion 360. Vane platforms 354 are fixedly attached to stator casing first portion 358. More specifically, vane platforms 354 have a first end 362 positioned within an opening 364 in stator casing first portion 358 and a second end 366 positioned within an opening 368 in stator casing first portion 358.

Compressor 350 also includes an annular slot 370 and an airflow passageway 372. Annular slot 370 is formed through at least a portion of stator casing 356. Annular slot 370 extends between stator casing first portion 358 and stator casing second portion 360. Stator casing first portion 358 forms at least a portion of a first wall 374 of annular slot 370. A flowpath splitter 376 is fixedly attached to stator casing second portion 360. More specifically, flowpath splitter 376 has a top 378 positioned within an opening 380 in stator casing second portion 360 and a bottom 382 positioned within an opening 384 in stator casing second portion 360.

Flowpath splitter 376 extends from stator casing second portion 360 to stator vanes 352, and extends around at least a portion of at least one stator vane 352. Flowpath splitter 376 directs the flow into annular slot 370 and fits around the trailing edge 386 of stator vanes 352. The portion of stator vanes 352 that is present in annular slot 370 reduces circumferential airflow. Stator casing second portion 360 and flowpath splitter 376 form a second wall 388 of annular slot 370. Compressor 350 also includes a plurality of rotor blades 390.

Figure 6:
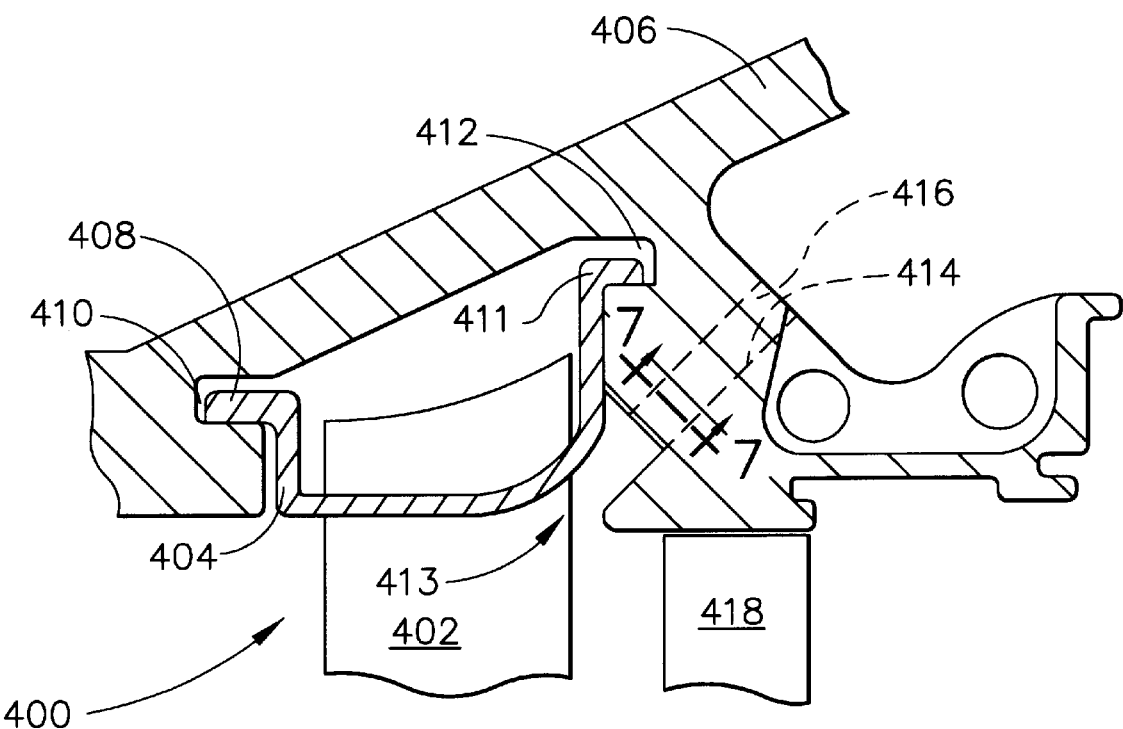
FIG. 6 is a schematic illustration of a still further embodiment of a high pressure multistage compressor with an annular slot.

FIG. 6 illustrates a multistage compressor 400 according to a still further embodiment. Compressor 400 includes a plurality of stator vanes 402 fixedly attached to a plurality of vane platforms 404. Vane platforms 404 are fixedly attached to a stator casing 406. More specifically, vane platforms 404 have a first end 408 positioned within an opening 410 in stator casing 406 and a second end 411 positioned within an opening 412 in stator casing 406.

Compressor 400 also includes a passageway 413 partially formed through stator casing 406 and annular slot 414. Annular slot 414 includes a plurality of openings 416 extending therethrough to prevent circumferential airflow and for efficient air extraction. Compressor 400 also includes a plurality of rotor blades 418.

Figure 7:
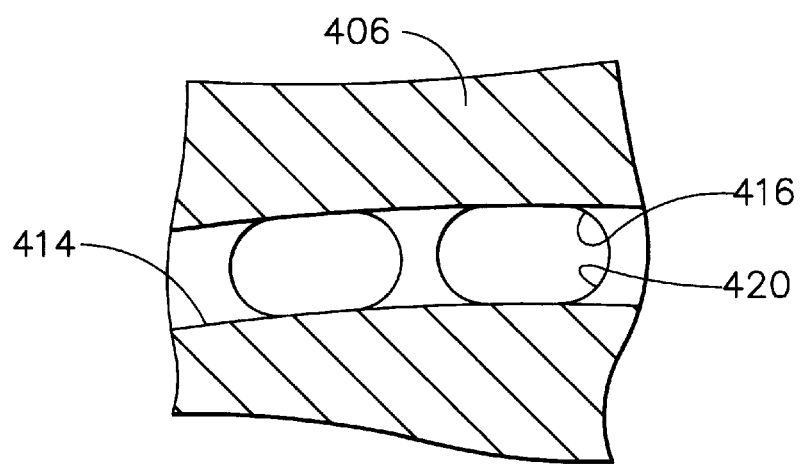
FIG. 7 is a cross section view along line 7—7 of the annular slot shown in FIG. 6.

FIG. 7 is a cross section view of an annular slot 414 illustrating openings 416 as substantially oval openings 420. Oval openings 420 are substantially evenly spaced along annular slot 414 and extend through stator casing 406. Oval openings 420 are formed in stator casing 406 to prevent circumferential airflow.

Figure 8:
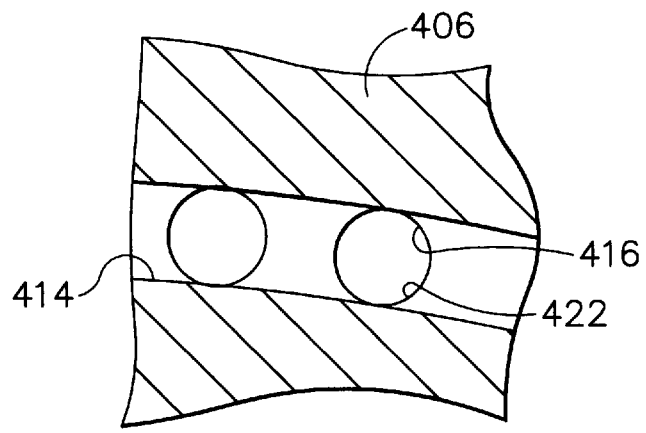
FIG. 8 is a cross section view of the annular slot shown in FIG. 6 in an alternate configuration.

FIG. 8 is a cross section view of an annular slot 414 illustrating openings 416 as substantially circular openings 422. Circular openings 422 are substantially evenly spaced along annular slot 414 and extend through stator casing 406. Circular openings 422 are incorporated into stator casing 406 to prevent circumferential airflow.

Figure 9:
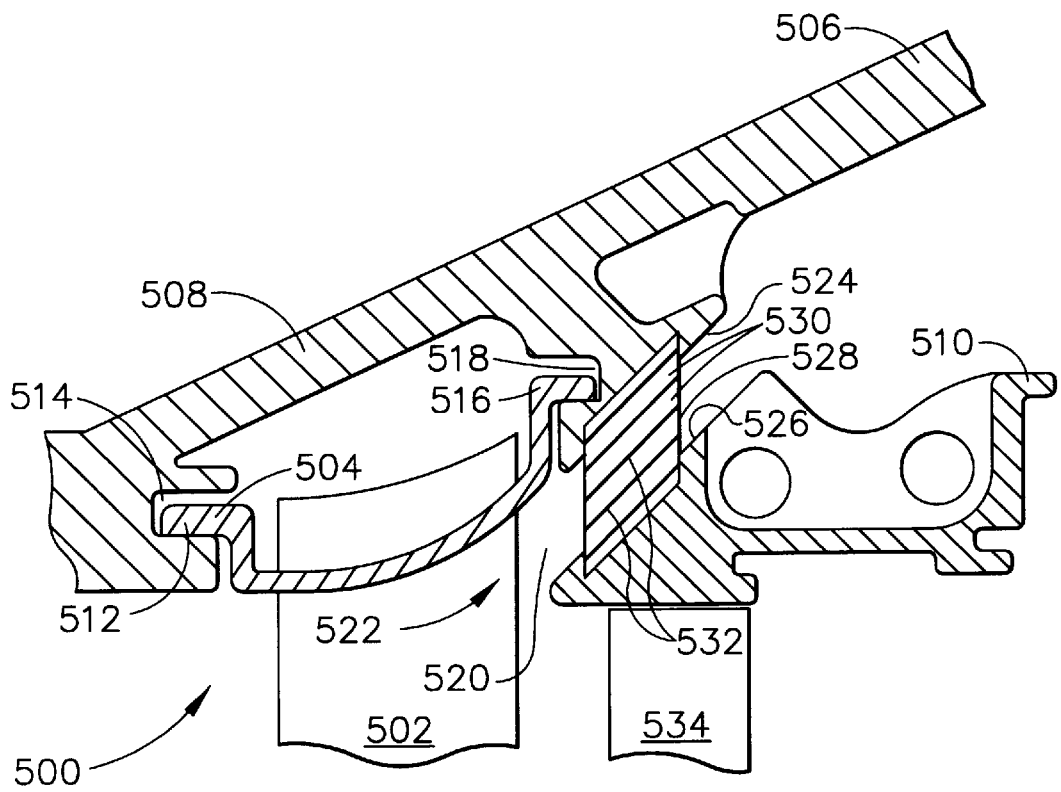
FIG. 9 is a schematic illustration of another embodiment of a high pressure multistage compressor with an annular slot.

FIG. 9 illustrates a multistage compressor 500 according to another embodiment. Compressor 500 includes a plurality of stator vanes 502 fixedly attached to a plurality of vane platforms 504. Vane platforms 504 are attached to a stator casing 506. Stator casing 506 includes a first portion 508 and a second portion 510. Vane platforms 504 are attached to stator casing 506. More specifically, vane platforms 504 have a first end 512 positioned within an opening 514 in stator casing first portion 508 and a second end 516 positioned within an opening 518 in stator casing first portion 508.

Compressor 500 also includes an annular slot 520 and an airflow passageway 522 formed through stator casing 506.

Annular slot 520 extends between stator casing first portion 508 and stator casing second portion 510. Stator casing first portion 508 forms a first wall 524 of annular slot 520. Stator casing second portion 510 forms a second wall 526 of annular slot 520.

Annular slot 520 includes a honeycomb cell structure 528 to reduce circumferential flow. Honeycomb structure 528 includes a plurality of cells 530 and a plurality of cell walls 532. In one embodiment, honeycomb cell structure 528 is inserted into annular slot 520. Alternatively, honeycomb cell structure 528 could be formed unitary with stator casing 506. Honeycomb cell structure 528 is oriented along a longitudinal path of annular slot 520. Stator vanes 502 further partition annular slot 520 for maintaining even airflow. Compressor 500 also includes a plurality of rotor blades 534.

The compressor utilizes the stator casing to form a first wall for an extraction slot. The vane platforms are smoothed and rounded to extend away from the air flowpath. The rounded, curved, shape of the vane platforms reduce discontinuities in the extraction slot entry flowpath. As a result, the pressure drop into the bleed manifold is reduced, and thus provides additional pressure for later air use.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A compressor for a gas turbine engine, said compressor comprising:
    a stator comprising a plurality of stator vanes assemblies, each said assembly comprising a stator vane and a stator vane platform, said stator further comprising a stator casing supporting said stator vane assemblies, said stator casing comprising a first portion and a second portion, an annular slot extending substantially around said stator casing and positioned between said stator casing first portion and said stator casing second portion, said stator vane platforms forming a smoothed and rounded entrance corner and a portion of a first wall of said annular slot, a partition extending into said annular slot and configured to reduce circumferential airflow to said annular slot; and
    a rotor comprising a plurality of rotor blades configured to rotate with respect to said stator vanes.

2. A compressor in accordance with claim 1 wherein said annular slot extends substantially 360 degrees around said compressor.

3. A compressor in accordance with claim 1 wherein said annular slot is devoid of side walls.

4. A compressor in accordance with claim 1 wherein said plurality of stator vanes further includes a plurality of third stage stator vanes and said plurality of rotor blades further includes a plurality of fourth stage rotor blades, said annular slot positioned between said third stage stator vanes and said fourth stage rotor blades.

5. An extraction system for a compressor of a turbine engine, said system comprising:
    at least one stator vane platform;
    at least one stator vane connected to said stator vane platform;
    a stator casing including a first portion and a second portion, said first portion supporting said stator vane platform;

an annular slot extending through said stator casing between said first portion and said second portion, said annular slot comprising a first wall and a second wall, said stator vane platform forming at least a portion of said first wall of said annular slot and said stator casing second portion forming said second wall of said annular slot; and a partition extending into said annular slot and configured to reduce circumferential airflow to said annular slot.

6. An extraction system in accordance with claim 5 wherein said annular slot extends substantially 360 degrees around the compressor and wherein said stator casing first portion forms at least a portion of said first wall of said annular slot.

7. An extraction system in accordance with claim 5 wherein said partition comprises a plurality of baffle plates extending from said second wall into said annular slot for preventing circumferential flow within said annular slot.

8. An extraction system in accordance with claim 7 wherein said baffle plates are supported by said stator casing second portion.

9. An extraction system in accordance with claim 5 wherein said partition formed by at least a portion of said stator vane extending into said annular slot.

10. An extraction system in accordance with claim 5 wherein said partition comprises a flow path splitter configured to extend from said stator casing second portion to at least one stator vane.

11. An extraction system in accordance with claim 10 wherein said flow path splitter extends around at least a portion of at least one stator vane.

12. An extraction system in accordance with claim 5 wherein said annular slot comprises a plurality of openings extending through said stator casing.

13. An extraction system in accordance with claim 5 wherein said partition comprises a honeycomb configuration including a plurality of cells oriented along said annular slot.

14. A method for fabricating a high pressure multistage compressor for a gas turbine engine including a plurality of stator vanes attached to a plurality of stator vane platforms connected to a stator casing, said method comprising the steps of:

configuring the stator casing into a first portion and a second portion;

forming an annular slot that extends through the stator casing between the first portion and the second portion, the second portion forming at least a portion of a second wall of the annular slot; and extending a partition into the annular slot to reduce circumferential airflow to the slot.

15. A method in accordance with claim 14, wherein said step of forming the annular slot comprises smoothing and rounding the stator vane platform to form at least a portion of a first wall of the annular slot.

16. A method in accordance with claim 14 wherein said step of attaching a partition further comprises the step of inserting baffles into the annular slot and connecting the baffles to the stator casing second portion.

17. A method in accordance with claim 14 wherein said step of attaching a partition further comprises the step of extending a portion of the stator vane into the annular slot.

18. A method in accordance with claim 14, further comprising the steps of:

forming a flowpath splitter;
connecting the flowpath splitter to the stator casing second portion; and extending the flowpath splitter around a trailing edge of the stator vane.

19. A method in accordance with claim 14, further comprising the step of forming a plurality of openings through the annular slot.

20. A method in accordance with claim 14 wherein said step of attaching a partition further comprises the step of forming a honeycomb configuration of cells through the annular slot and oriented along the annular slot.

* * * * *